United States Patent
Richards et al.

(10) Patent No.: US 9,494,485 B2
(45) Date of Patent: Nov. 15, 2016

(54) MEASURING PARALLELISM IN LIGHTGUIDE SURFACES

(71) Applicant: Google Inc., Mountain View, CA (US)

(72) Inventors: Evan M. Richards, Santa Clara, CA (US); Anurag Gupta, San Jose, CA (US)

(73) Assignee: Google Inc., Mountain View, CA (US)

( * ) Notice: Subject to any disclaimer, the term of this patent is extended or adjusted under 35 U.S.C. 154(b) by 241 days.

(21) Appl. No.: 14/200,718

(22) Filed: Mar. 7, 2014

(65) Prior Publication Data

US 2015/0253185 A1 Sep. 10, 2015

(51) Int. Cl.
 *G01N 21/94* (2006.01)
 *G01M 11/00* (2006.01)
 *G01B 11/27* (2006.01)

(52) U.S. Cl.
 CPC ............. *G01M 11/37* (2013.01); *G01B 11/27* (2013.01)

(58) Field of Classification Search
 None
 See application file for complete search history.

(56) References Cited

U.S. PATENT DOCUMENTS

| | | | |
|---|---|---|---|
| 4,340,304 A | 7/1982 | Massie | |
| 6,301,009 B1 | 10/2001 | Tinker | |
| 6,856,405 B2 | 2/2005 | Tang | |
| 7,002,694 B2 | 2/2006 | Schulte et al. | |
| 7,230,718 B2 | 6/2007 | Millerd et al. | |
| 2003/0151749 A1* | 8/2003 | Kim | G01B 9/02021 356/512 |
| 2012/0198712 A1* | 8/2012 | Hinderling | G01C 15/002 33/292 |
| 2013/0321798 A1* | 12/2013 | Urano | G01N 21/9501 356/237.5 |

* cited by examiner

*Primary Examiner* — Sath V Perungavoor
*Assistant Examiner* — Janese Duley
(74) *Attorney, Agent, or Firm* — Blakely Sokoloff Taylor & Zafman LLP (57) ABSTRACT

A system for measuring transparent optical elements includes a beam generator, optomechanics, an imaging module, and a logic unit. The beam generator is driven to emit a beam directed at a transparent optical element that is aligned by optomechanics. An image is captured of the beam after the beam reflects off of surfaces of the transparent optical element. The image is analyzed to measure tolerances of the transparent optical element.

19 Claims, 6 Drawing Sheets

MEASURING PARALLELISM IN LIGHTGUIDE SURFACES

TECHNICAL FIELD

This disclosure relates generally to optics, and in particular but not exclusively, relates to measuring parallelism in lightguide surfaces.

BACKGROUND INFORMATION

A head mounted display ("HMD") is a display device worn on or about the head. HMDs usually incorporate some sort of near-to-eye optical system to emit a light image within a few centimeters of the human eye. Single eye displays are referred to as monocular HMDs while dual eye displays are referred to as binocular HMDs. Some HMDs display only a computer generated image ("CGI"), while other types of HMDs are capable of superimposing CGI over a real-world view. This latter type of HMD can serve as the hardware platform for realizing augmented reality. With augmented reality, the viewer's image of the world is augmented with an overlaying CGI, also referred to as a heads-up display ("HUD").

HMDs have numerous practical and leisure applications. Aerospace applications permit a pilot to see vital flight control information without taking their eye off the flight path. Public safety applications include tactical displays of maps and thermal imaging. Other application fields include video games, transportation, and telecommunications.

Many HMDs utilize an eyepiece that includes a lightguide to direct CGI display light from a display of the HMD to a user's eye(s). Tolerances of the lightguide may become critical to properly direct the display light, in some HMDs. If the lightguide depends on the optical phenomenon of Total Internal Reflection ("TIR") to deliver an image to the eye of a user, the surfaces of the lightguide that facilitate the TIR must be manufactured within design parameters.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Embodiments of a system and method for measuring parallelism in lightguide surfaces are described herein. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1A:
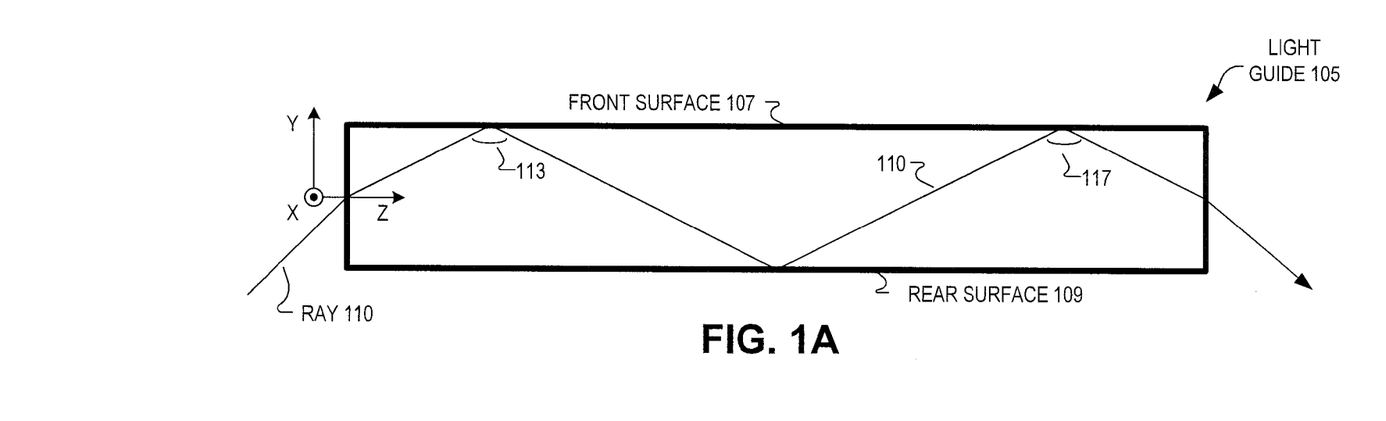
FIG. 1A includes a lightguide with two parallel surfaces and FIG. 1B includes a lightguide with two surfaces that are not parallel, in accordance with an embodiment of the disclosure.

FIG. 1A includes a lightguide 105 that includes a front surface 107 that is parallel with a rear surface 109 of lightguide 105. Lightguide 105 may be made from optical grade plastic or glass. Ray 110 propagates along an optical path into light guide 105, reflects off front surface 107, reflects off rear surface 109, reflects off front surface 107 again, and exits lightguide 105. Along the optical path, ray 110 reflects back into lightguide 105 because it encounters the front surface 107 and rear surface 109 at an angle that does not overcome the critical angle. This phenomenon is commonly known as Total Internal Reflection ("TIR") and occurs when $(n_2/n_1)*\sin(\theta) > 1$, where $n_2$ is the index of refraction of the lightguide, $n_1$ is the index of refraction of the ambient material (typically air having index of refraction of 1), and $\theta$ is the incident angle between the ray and the surface normal inside the lightguide. In FIG. 1A, angle 113 and angle 117 are the same because front surface 107 and rear surface 109 are parallel.

Figure 1B:
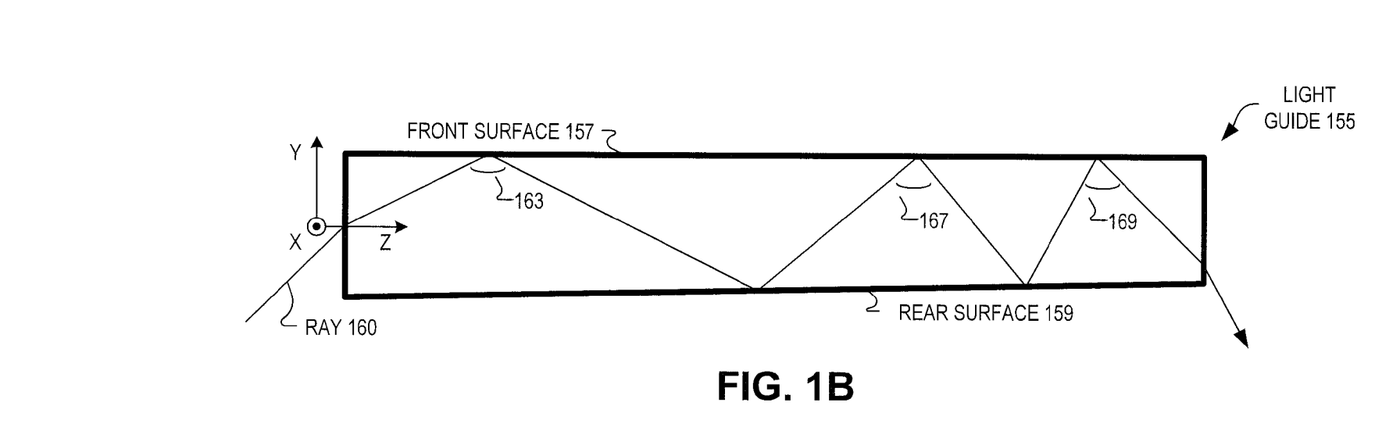

FIG. 1B includes a lightguide 155 that includes a front surface 157 that is not parallel with a rear surface 159 of lightguide 155. Lightguide 155 is made from the same material as lightguide 105. Ray 160 propagates along an optical path into light guide 155, reflects off front surface 157, reflects off rear surface 159, reflects off front surface 157 again, reflects off rear surface 159 again, reflects off front surface 157 for a third time, and exits lightguide 105. Ray 160 and ray 110 enter lightguides 105 and 155, respectively, at the same angle. However, the wedge (non-parallel) nature of lightguide 155 causes ray 160 to take a different (and longer) optical path than ray 110. More specifically, the wedge nature of lightguide 155 results in the angle of incidence of ray 160 on front surface 157 and rear surface 159 becoming steeper and steeper as it propagates down lightguide 155. Expressed mathematically, ray 160 will deviate $2*\theta$, where $\theta$ is the wedge angle between front surface 157 and rear surface 159. This deviation causes angle 167 to be smaller than angle 163 and angle 169 to be smaller than angle 167.

Figure 2A:
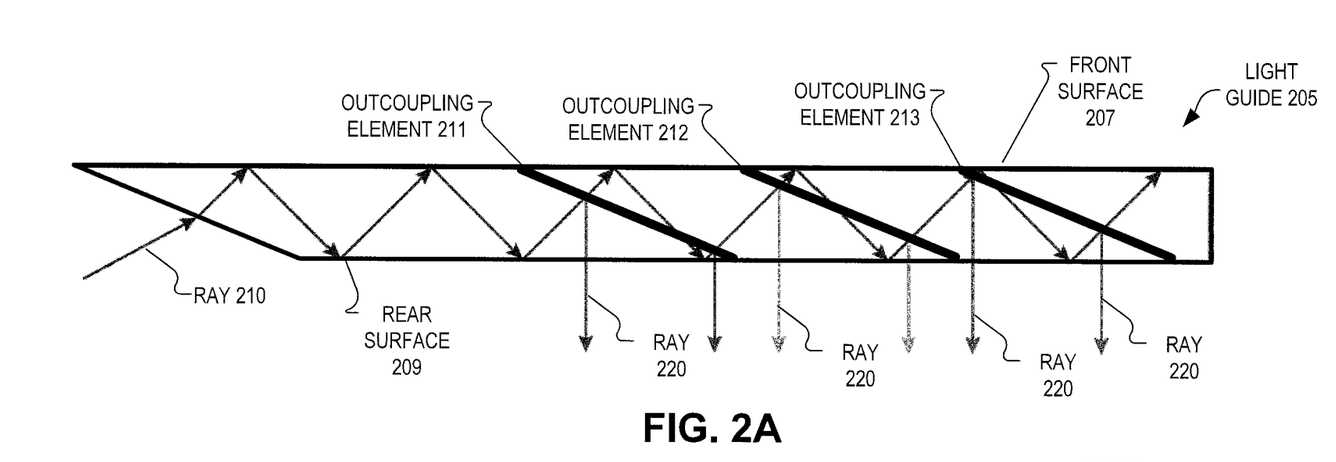
FIG. 2A includes a lightguide with two parallel surfaces that includes outcoupling elements and FIG. 2B includes a lightguide having outcoupling elements and two surfaces that are not parallel, in accordance with an embodiment of the disclosure.
Figure 2B:
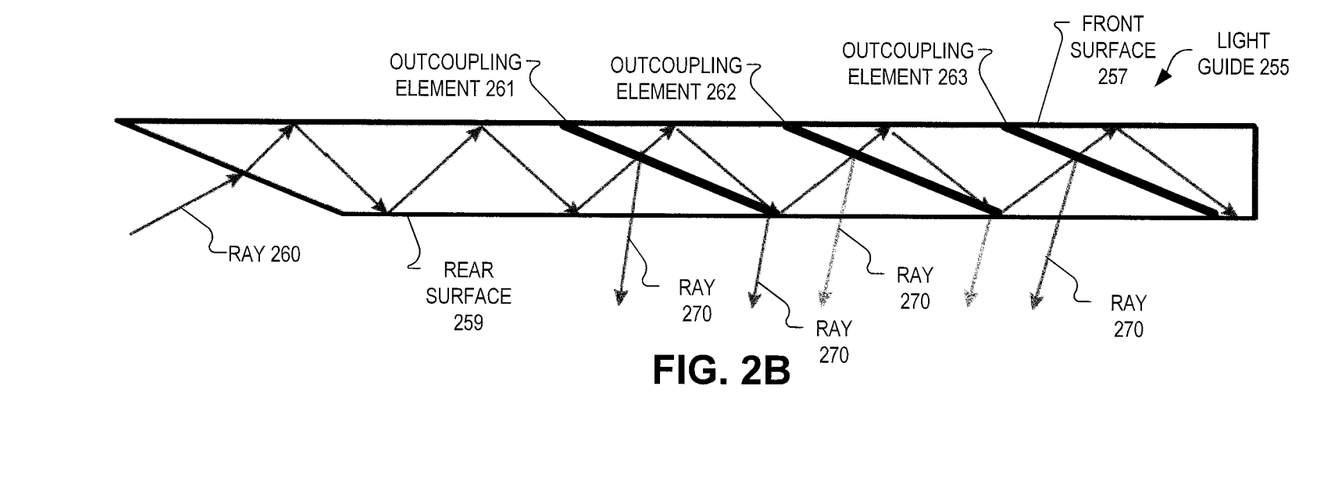

FIG. 2A illustrates a top view of a lightguide 205 that includes a front surface 207 that is parallel with a rear surface 209 of lightguide 205, in accordance with an embodiment of the disclosure. Lightguide 205 may be part of an eyepiece of a Head Mounted Display ("HMD") that directs image light into the eye of a wearer/user of the HMD. Lightguide 205 includes outcoupling elements 211, 212, and 213 that are angled between front surface 207 and rear surface 209. Outcoupling elements 211, 212, and 213 may be polarizing beam splitters, in some embodiments. Outcoupling elements 211, 212, and 213 are positioned to direct ray 220 into the eye of a wearer of an HMD by reflecting a portion of ray 210. FIG. 2B illustrates a top view of a lightguide 255. Lightguide 255 is similar to lightguide 205 except that front surface 257 is not parallel with rear surface 259 of lightguide 255.

It is understood that rays 210/260 are example rays for illustration purposes of an image directed into the eye of a wearer of an HMD. Many more rays from a display may also be directed into lightguide 205/255 to direct an image on a display into an eye of a wearer of an HMD.

Ray 210 propagates into lightguide 205 and predictably reflects between front surface 207 and rear surface 209. Outcoupling elements 211, 212, and 213 direct at least a portion of ray 210 out of lightguide 205 as outcoupled rays 220. Outcoupled rays 220 are normal to the rear surface 209, as intended to direct rays 220 into the user's eye. In contrast, ray 260 propagates into lightguide 255 and reflects between front surface 257 and rear surface 259. However, because front surface 257 and rear surface 259 are not parallel, ray 260 deviates by 2*θ where θ is the wedge angle between surface 257 and rear surface 259. This deviation in ray 260 causes outcoupling elements 261, 262, and 263 to direct portions of ray 260 out of lightguide 255 as outcoupled rays 270, which are not normal to rear surface 259. Outcoupled rays 270 propagating at a non-normal angle to rear surface 259 may allow outcoupled rays 270 to end up outside an eyebox of an eye of a wearer of an HMD. In other words, the image intended to be directed into the user's eye may be misdirected as a result of non-parallel front surface 257 and rear surface 259.

It is appreciated that outcoupled rays 220 may intentionally be directed in a non-normal direction relative to rear surface 209 in some embodiments. However, in that embodiment, the orientation (e.g. parallelism) of rear surface 209 and front surface 207 will still have tolerances to be measured to ensure proper delivery of an image to an eye of a user of an HMD.

Figure 3:
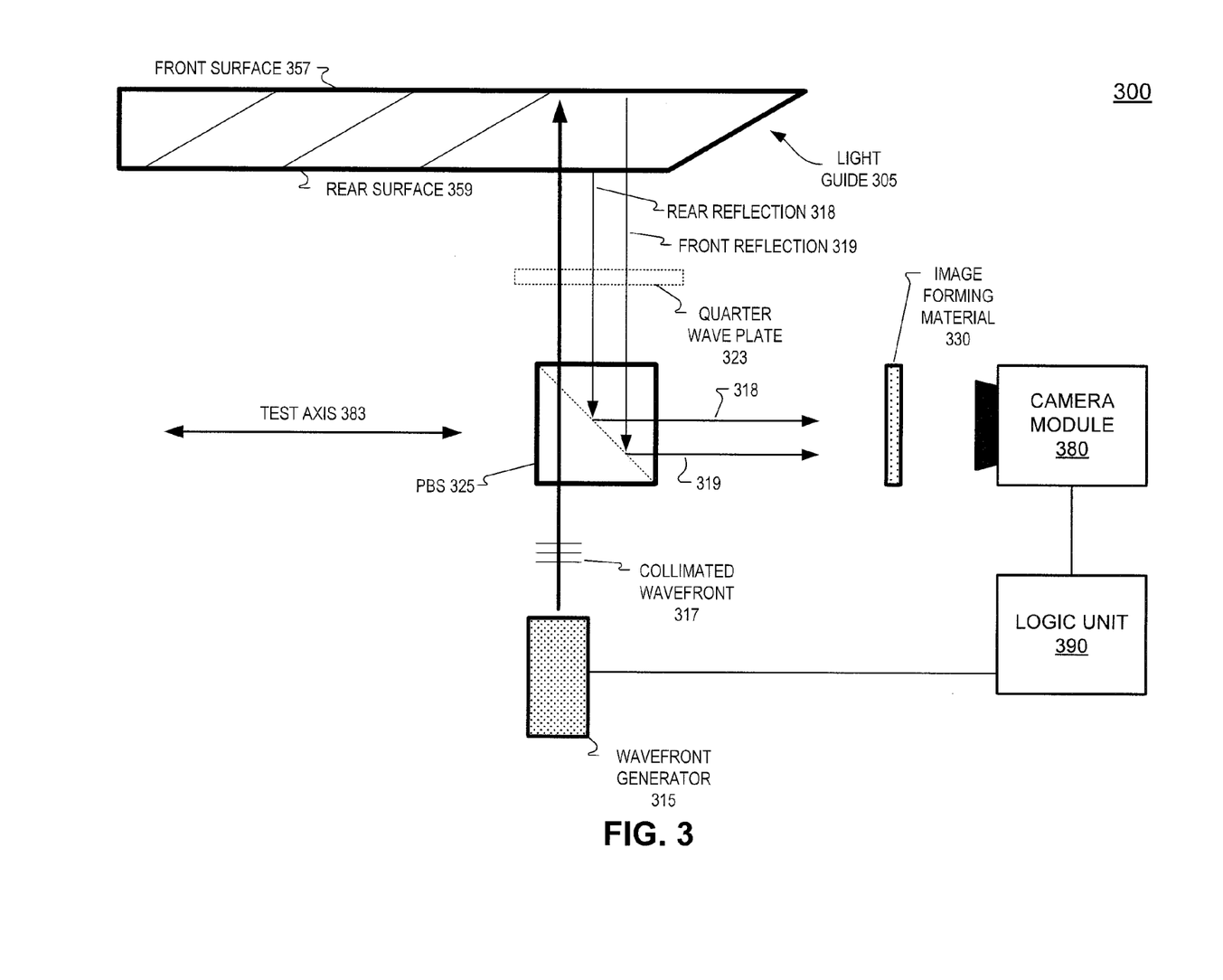
FIG. 3 is a system for measuring parallel surfaces in lightguides that includes a wavefront generator, a Polarized Beam Splitter ("PBS"), a camera module, and a logic unit, in accordance with an embodiment of the disclosure.

Since non-parallel lightguide surfaces may be ineffective at directing images to a user's eye, and thus undesirable, a system that tests for parallel surfaces in lightguides would be useful. FIG. 3 is a system 300 for measuring parallel surfaces in lightguides that includes a wavefront generator 315, a Polarizing Beam Splitter ("PBS") 325, image forming material 330, a camera module 380, and a logic unit 390, in accordance with an embodiment of the disclosure. Logic unit 390 may include logic circuitry such as a processor, a field-programmable gate array ("FPGA"), or otherwise. Logic unit 390 may also include a memory coupled to a processor. The memory may store images, settings, and firmware/software that can be accessed and executed by the processor, for example. Logic unit 390 may be a desktop or laptop computer. Logic unit 390 is coupled to drive wavefront generator 315, in FIG. 3. Wavefront generator 315 generates a collimated wavefront 317. Wavefront generator 315 may be a laser, in some embodiments. Camera module 380 may include a lens to focus on image forming material 330 and a digital image sensor to capture an image formed on image forming material 330. Camera module 380 may be a Digital Single-Lens Reflex ("DSLR") camera. Logic unit 390 is coupled to receive an image captured by camera module 380, via Universal Serial Port ("USB"), for example. In one embodiment, logic unit 390 is coupled to command camera module 380 to capture the image.

Although not illustrated in FIG. 3, precision optomechanics are arranged to hold and align lightguide 305 to receive collimated wavefront 317 after it propagates through PBS 325. PBS may be a 50/50 beam splitter in some embodiments. The precision optomechanics may include transparent and non-transparent elements. The precision optomechanics align lightguide 305 so that rear surface 359 should be arranged normal to incoming collimated wavefront 317.

In operation, logic unit 390 may drive wavefront generator 315 to emit collimated wavefront 317. Collimated wavefront 317 encounters PBS 325, which passes a passing portion of collimated wavefront 317 and reflects the remaining portion. In the illustrated embodiment, PBS 325 is angled at a 45° angle to the incoming collimated wavefront 317. The passing portion continues propagating toward lightguide 305 as collimated wavefront 317 and encounters rear surface 359 of lightguide 305. In one embodiment, approximately 4% of collimated wavefront 317 is reflected by rear surface 359 as rear reflection 318, while the remaining approximately 96% of collimated wavefront 317 propagates through lightguide 305 to front surface 357. When the remaining 96% encounters front surface 357, approximately 4% of the 96% is reflected by front surface 357 as front reflection 319. Therefore, rear reflection 318 is roughly the same intensity as front reflection 319, with rear reflection 318 having a slightly higher intensity than front reflection 319.

Rear reflection 318 and front reflection 319 encounter PBS 325 which is disposed between wavefront generator 315 and the optomechanics (and lightguide 305). PBS 325 is positioned to direct/reflect rear reflection 318 and front reflection 319 toward image forming material 330. Image forming material 330 is positioned to receive rear reflection 318 and front reflection 319 from PBS 325. In one embodiment, image forming material 330 includes a ground glass screen. Other suitable diffusive materials can be used in place of a ground glass screen.

Optionally, in one embodiment, quarter wave plate 323 is disposed between PBS 325 and the optomechanics (and lightguide 305). In the illustrated embodiment, the surface of quarter wave plate 323 is normal to incoming collimated wavefront 317 and the fast axis of quarter wave plate 323 is rotated at a 45° rotation relative to the vertical polarization axis. An embodiment that includes quarter waveplate 323 may provide greater optical efficiency to system 300. If PBS 325 passes horizontally polarized light parallel to test axis 383 and reflects vertically polarized light, collimated wavefront 317 will be horizontally polarized as it propagates toward the optomechanics (and lightguide 305). The horizontally polarized collimated wavefront 317 will then be converted to circularly polarized light by propagating through quarter waveplate 323. Upon reflection at rear surface 359 and front surface 357, the circular polarization will convert to its orthogonal circular polarization state. Rear reflection 318 and front reflection 319 will then be converted to vertically polarized light by propagating through quarter waveplate 323 on their way to PBS 325.

Since rear reflection 318 and front reflection 319 will then be vertically polarized when they encounter PBS 325 (and PBS reflects vertically polarized light and passes horizontally polarized light), PBS will reflect virtually 100% of rear reflection 318 and front reflection 319.

Regardless of whether or not quarter wave plate 323 is included in system 300, camera module 380 is positioned to capture an image formed by rear reflection 318 and front reflection 319 on image forming material 330. The recombination of rear reflection 318 and front reflection 319 forms interference patterns in the image. An image capture or more than one image capture by camera module 380 may be initiated by logic unit 390 to capture the image. Camera module 380 is coupled to send the image to logic unit 390. Logic unit 390 receives the image to analyze a degree of parallelism between front surface 357 and rear surface 359.

Figure 4:
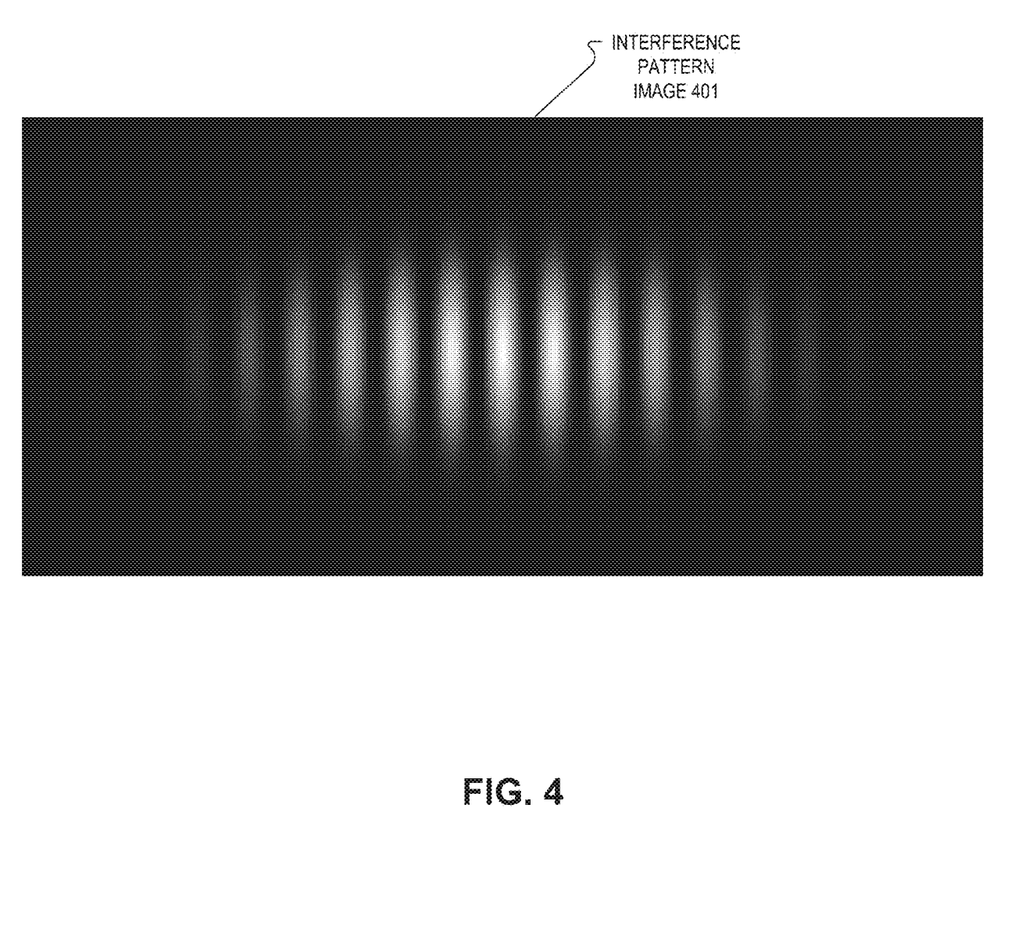
FIG. 4 is an example image of an interference pattern formed by reflections from surfaces of a lightguide, in accordance with an embodiment of the disclosure.

FIG. 4 is an example interference pattern image 401 that includes interference patterns formed by rear reflection 318 and front reflection 319, in accordance with an embodiment of the disclosure. Interference pattern image 401 includes multiple aligned fringes (white roughly oval shapes in image 401) with (black) spaces between them. To analyze the degree of parallelism between front surface 357 and rear surface 359, logic unit 390 may determine an orientation of the fringes and/or spacing between the fringes.

Spacing between the fringes provides the angle between front surface 357 and rear surface 359. Expressed mathematically, the angle between front surface 357 and rear surface 359 is described as $\sin(\theta)=\lambda/d$, where $\lambda$ is the wavelength of light in collimated wavefront 317 and d is the distance between the spacing between the fringes in image 401. The distance d may be determined by logic unit 390 using an image analysis algorithm that calculates the physical dark space between the fringes. The wavelength of collimated wavefront 317 will be known by logic unit 390. If wavefront generator 315 is a laser, the wavelength may have a very narrow bandwidth for simpler calculations.

The orientation of the fringes (e.g. rotated relative to test axis 383) indicates the orientation of the angled difference between front surface 357 and rear surface 359. In the illustrated image 401, the fringes are vertically aligned indicating a wedge angle between front surface 357 and rear surface 359, similar to the illustration of FIG. 1B.

Figure 5:
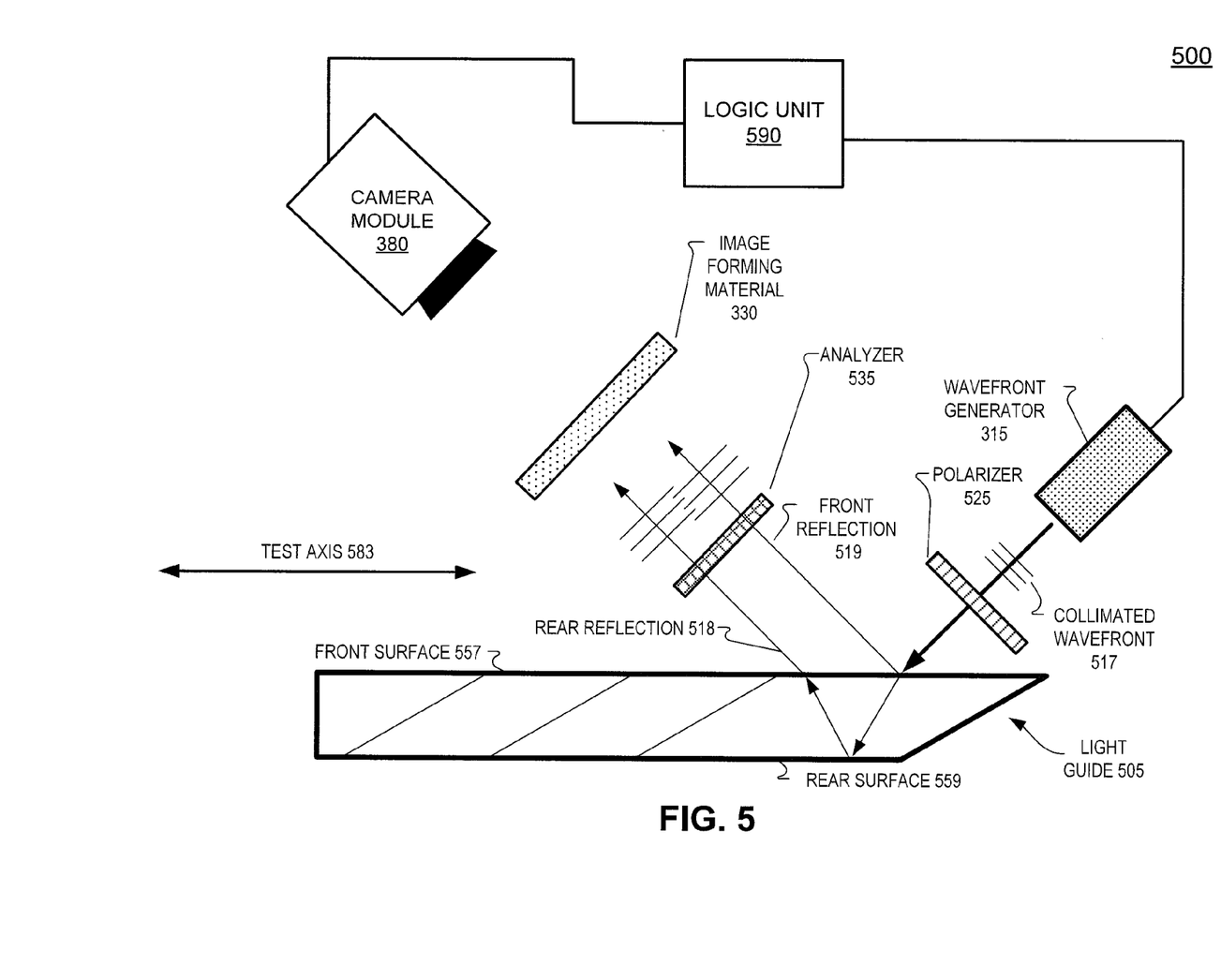
FIG. 5 is a system for measuring parallel surfaces in lightguides that includes a wavefront generator, a polarizer, a camera module, and a logic unit, in accordance with an embodiment of the disclosure.

FIG. 5 is a system 500 for measuring parallel surfaces in lightguides, in accordance with an embodiment of the disclosure. System 500 is similar to system 300 illustrated in FIG. 3 although collimated wavefront 517 of system 500 encounters lightguide 505 at a non-normal incidence. System 500 in FIG. 5 includes wavefront generator 315, a polarizer 525, an analyzer 535, image forming material 330, camera module 380, and a logic unit 590. Logic unit 590 may include similar hardware to logic unit 390. In system 500, polarizer 525 and analyzer 535 are optional for controlling the intensity of rear reflection 518 and front reflection 519. Polarizer 525 may be angled at a 45° to front surface 557 of lightguide 505, which is aligned by optomechanics. Wavefront generator 315 may be positioned to launch collimated wavefront 517 normal to polarizer 525. Analyzer 535 may also be angled 45° to front surface 557, but angled perpendicular to polarizer 525, as illustrated. Analyzer 535 is disposed in a parallel plane to image forming material 330 in FIG. 5. Analyzer 535 includes a linear polarizer, in one embodiment.

Although not illustrated in FIG. 5, precision optomechanics are arranged to hold and align lightguide 505 to receive collimated wavefront 517 after it propagates through polarizer 525. The precision optomechanics may include transparent and non-transparent elements.

Logic unit 590 is coupled to drive wavefront generator 315 to emit a collimated wavefront 517 in FIG. 5. Logic unit 590 is also coupled to receive an image captured by camera module 380, via Universal Serial Port ("USB"), for example. In one embodiment, logic unit 590 is coupled to command camera module 380 to capture the image.

Wavefront generator 315 is arranged to emit collimated wavefront 517 at a non-normal incidence to front surface 557 of light guide 505. In operation, logic unit 590 may drive wavefront generator 315 to emit collimated wavefront 517. Collimated wavefront 517 encounters polarizer 525, which passes a passing portion of collimated wavefront 517. The passing portion continues propagating toward lightguide 505 as collimated wavefront 517 and encounters front surface 557 of lightguide 305. A portion of collimated wavefront 517 is reflected by front surface 557 as front reflection 519 toward image forming material 330. The non-reflected portion of collimated wavefront 517 propagates at an angle toward rear surface 559 of lightguide 505, reflects off rear surface 559 as rear reflection 518, and propagates through front surface 557 toward image forming material 330. If analyzer 535 is installed in system 500, both rear reflection 518 and front reflection 519 encounter analyzer 535 on their way to image forming material 330.

Camera module 380 captures an image formed on image forming material 330 and sends it to logic unit 590. Rear reflection 518 and front reflection 519 create an overlap region of interference fringes in the image captured by camera module 380. Non-overlap regions will have the reflected intensity of the beam from the surface from which it reflects. The spacing between bright fringes provides the angle θ between the surfaces being measured as described by $\sin(\theta)=\lambda/d$, where $\lambda$ is the wavelength of light in collimated wavefront 517 and d is the distance between the spacing between the bright fringes. Similar to the analysis of image 401, orientation of the fringes indicates orientation of the difference between front surface 557 and rear surface 559. The test method in FIG. 5 causes one reflection of collimated wavefront 517 off each of front surface 557 and rear surface 559. Each reflection causes a 2*θ deviation, which must be taken into account when calculating the distance d.

In system 300 and 500, the precision optomechanics can be used to align one surface of the lightguide under test. This arrangement may allow for automatic placement of lightguides into the optomechanics for rapid test. Also in system 300 and 500, an automatic translation stage may move along test axis 383 or 583 so that the parallelism of the front and rear surface of the lightguide can be tested in multiple locations. The automatic translation stage may include a stepper motor that incrementally moves the optomechanics along the test axis 383 or 583. At each step/position along test axis 383 or 583, logic unit 390/590 may drive wavefront generator 315 to emit a collimated wavefront and initiate an image capture with camera module 380 that images a front and rear reflection of a lightguide under test. The image can then be analyzed by the logic unit for each location along the test axis to give a more complete analysis of the lightguide under test. Logic unit 390/590 may be coupled to also control the automatic translation stage.

Figure 6A:
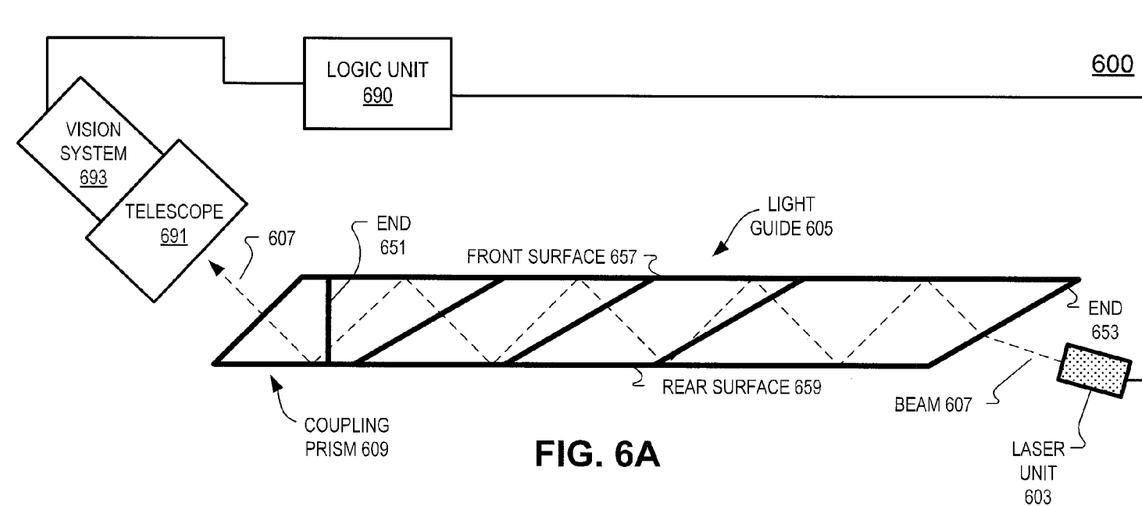
FIG. 6A is a system for measuring parallel surfaces in lightguides that includes a laser unit, a vision system, and a logic unit, in accordance with an embodiment of the disclosure.

FIG. 6A is a system 600 for measuring parallel surfaces in lightguides, in accordance with an embodiment of the disclosure. System 600 includes a laser unit 603, a vision system 693, and a logic unit 690. Logic unit 690 may include similar hardware to logic unit 390. Logic unit 690 is coupled to drive laser unit 603 to emit laser beam 607. Logic unit 690 is also coupled to receive an image captured by vision system 693, via Universal Serial Port ("USB"), for example. In one embodiment, logic unit 690 is coupled to command vision system 693 to capture the image.

Although not illustrated in FIG. 6A, precision optomechanics are arranged to hold and align lightguide 605 to receive laser beam 607 from laser unit 603. The precision optomechanics may include transparent and non-transparent elements.

In FIG. 6A, laser unit 603 emits laser beam 607, which is received at a first end surface 653 of lightguide 605. Laser beam 607 initially propagates along an optical path that encounters first end surface 653, front surface 657, and rear surface 659, in that order. After reflecting off rear surface 659, laser beam 607 continues along the optical path, bouncing/reflecting through lightguide 605 until exiting a second end surface 651 of lightguide 605. In FIG. 6A, an outcoupling prism 609 is optically coupled to second end surface 651 to direct laser beam 607 toward vision system 693 as laser beam 607 exits lightguide 605. An index matching fluid may be applied between lightguide 605 and outcoupling prism 609.

Figure 6B:
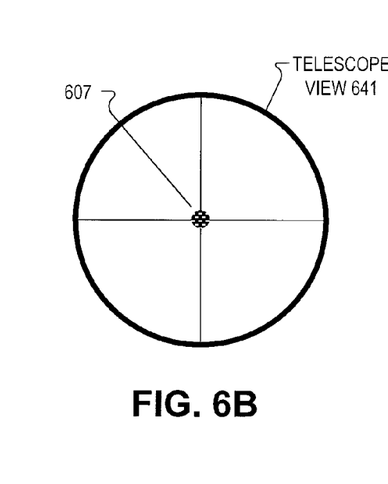
FIGS. 6B and 6C illustrate axial views through a telescope lens that include a recticle and a laser beam, in accordance with an embodiment of the disclosure.
Figure 6C:
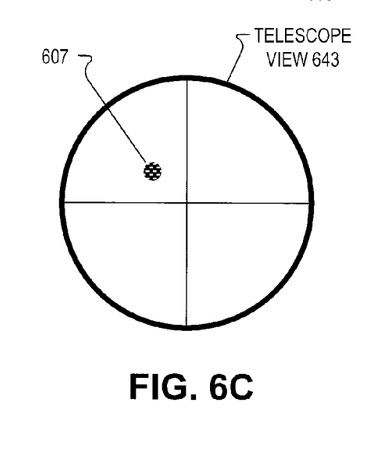

In FIG. 6A, telescope lens 691 is included in vision system 693. FIGS. 6B and 6C illustrate axial views through telescope lens 691, in accordance with an embodiment of the disclosure. In one embodiment, the aperture of telescope lens 691 is large enough to capture laser beam 607 leaving at any position on outcoupling prism 609. FIG. 6B shows telescope view 641 that includes an alignment recticle and laser beam 607 in the middle of the alignment reticle. System 600 may be arranged so that when an ideal, conforming lightguide is placed into system 600, laser beam 607 is centered in telescope view 641. FIG. 6C shows telescope view 643 that includes an laser beam 607 being uncentered with respect to the alignment reticle. This view represents a lightguide that has angular deviation between front surface 657 and rear surface 659 and is not ideal. The distance and direction of laser beam 607 from the alignment reticle indicates the orientation and magnitude of difference between the front surface 657 and rear surface 659.

Vision system 693 may capture an image of the telescope view and send it to logic unit 690. Alternatively, vision system 693 may analyze the position of laser beam 607 with respect to the alignment reticle and send the results to logic unit 690. In one embodiment, laser beam 607 must be within a pre-determined radius of the center of the alignment reticle for the lightguide under test to be considered conforming. When laser beam 607 is outside the pre-determined radius, that lightguide is considered non-conforming.

In one embodiment, laser unit 603 includes a laser mechanically coupled to a rotation stage mechanically coupled to rotate the laser for varying the angle that beam 607 is directed into first end surface 653. The rotation stage is coupled to be driven by logic unit 690.

In systems 300, 500, and 600, the respective logic units 390, 590, and 690 may be coupled to output a pass or fail signal to indicate whether the lightguide under test is within a pre-determined tolerance. This quality control feature will allow non-conforming lightguides to be sorted from conforming lightguides. Additional features can be added to systems 300, 500, and 600, including pick and place hardware to quickly load lightguides into the optomechanics for testing.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible non-transitory machine-readable storage medium includes any mechanism that provides (i.e., stores) information in a form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A system for measuring parallelism in a transparent optical element, the system comprising:
    a wavefront generator for generating a collimated wavefront;
    optomechanics arranged to align the transparent optical element to receive the collimated wavefront, wherein the transparent optical element is positioned so that the collimated wavefront encounters a first surface of the transparent optical element prior to a second surface of the transparent optical element;
    an image forming material positioned to receive a first reflection of the collimated wavefront reflecting off the first surface of the transparent optical element, the image forming material also positioned to receive a second reflection of the collimated wavefront reflecting off the second surface of the transparent optical element, the image forming material formed from a diffuse material such that an image is formed on the image forming material due to the first and second reflections of the collimated wavefront;
    a camera module coupled to capture the image formed on the image forming material; and
    a logic unit coupled to drive the wavefront generator and coupled to receive the image from the camera module, the logic unit configured to analyze a degree of parallelism between the first surface and the second surface based on interference patterns in the image, wherein the interference patterns are formed by the first reflection and the second reflection.

2. The system of claim 1, wherein the wavefront generator is positioned to launch the collimated wavefront normal to the first surface and the second surface.

3. The system of claim 2 further comprising:
a polarizing beam splitter ("PBS") disposed between the wavefront generator and the optomechanics so that the collimated wavefront encounters the PBS as it propagates toward the transparent optical element, wherein the PBS is positioned to reflect the second reflection and the first reflection toward the image forming material.

4. The system of claim 3 further comprising:
a quarter wave plate disposed between the PBS and the optomechanics, wherein the quarter wave plate is rotated relative to an output polarization of the PBS.

5. The system of claim 1, wherein the wavefront generator is positioned to launch the collimated wavefront at an angle to the first surface and the second surface.

6. The system of claim 5 further comprising:
a polarizer positioned between the wavefront generator and the optomechanics, the wavefront generator positioned to launch the collimated wavefront normal to the polarizer; and
a polarization analyzer positioned between the optomechanics and the image forming material, the polarization analyzer disposed in a parallel plane to the image forming material.

7. The system of claim 6, wherein the polarization analyzer includes a linear polarizer.

8. The system of claim 1, wherein the image forming material includes a ground glass surface.

9. The system of claim 1 further comprising:
an automatic translation stage coupled to move the optomechanics along a test axis that is approximately parallel to the first surface of the transparent optical element, wherein the logic unit is coupled to control the automatic translation stage.

10. The system of claim 1, wherein said analyzing the degree of parallelism between the first surface and the second surface includes determining a spacing and an orientation of fringes of the interference patterns of the image.

11. The system of claim 1, wherein the logic unit is coupled to output a fail signal when the degree of parallelism is not within a parallelism tolerance.

12. A system for measuring a transparent optical element, the system comprising:
a beam generator to generate a light beam;
optomechanics arranged to align the transparent optical element to receive the light beam, the transparent optical element including front and rear surfaces and first and second end surfaces, the first and second end surfaces disposed opposite one another and between the front and rear surfaces, wherein the transparent optical element is positioned so that the light beam enters the transparent optical element at a first end surface disposed between a front surface and a rear surface of the transparent optical element, the light beam propagating along an optical path that encounters the first end surface, the front surface, and the rear surface, in that order;
a vision system to capture an image of the light beam after the light beam propagates out of the transparent optical element through a second end surface disposed between the front surface and the rear surface, the second end surface disposed opposite from the first end surface, wherein the vision system includes a lens; and
a logic unit coupled to drive the beam generator and coupled to receive the image of the light beam, the logic unit configured to analyze the image of the light beam to determine whether the front and rear surface of the transparent optical element are conforming.

13. The system of claim 12, wherein said analyzing the image includes determining a difference between the light beam in the image and an ideal light beam.

14. The system of claim 13, wherein the logic unit is coupled to output a fail signal when the difference between the light beam in the image and the ideal light beam reaches a pre-determined threshold.

15. The system of claim 12, wherein the light beam propagating along the optical path encounters the front surface again and then encounters the rear surface again after initially encountering, in order, the first end surface, the front surface, and the rear surface.

16. The system of claim 12 further comprising:
an outcoupling prism for optically coupling to the second end surface of the transparent optical element, wherein the outcoupling prism directs the light beam toward the vision system after the light beam propagates out of the transparent optical element.

17. The system of claim 12, wherein the lens is a telescope lens.

18. The system of claim 12, wherein the beam generator includes a laser and the light beam is a laser beam.

19. The system of claim 12, further comprising:
a rotation stage mechanically coupled to rotate the beam generator for varying the angle that the light beam is directed into the first end surface of the transparent optical element, wherein the rotation stage is coupled to be driven by the logic unit.

* * * * *